Figures 1, 2:
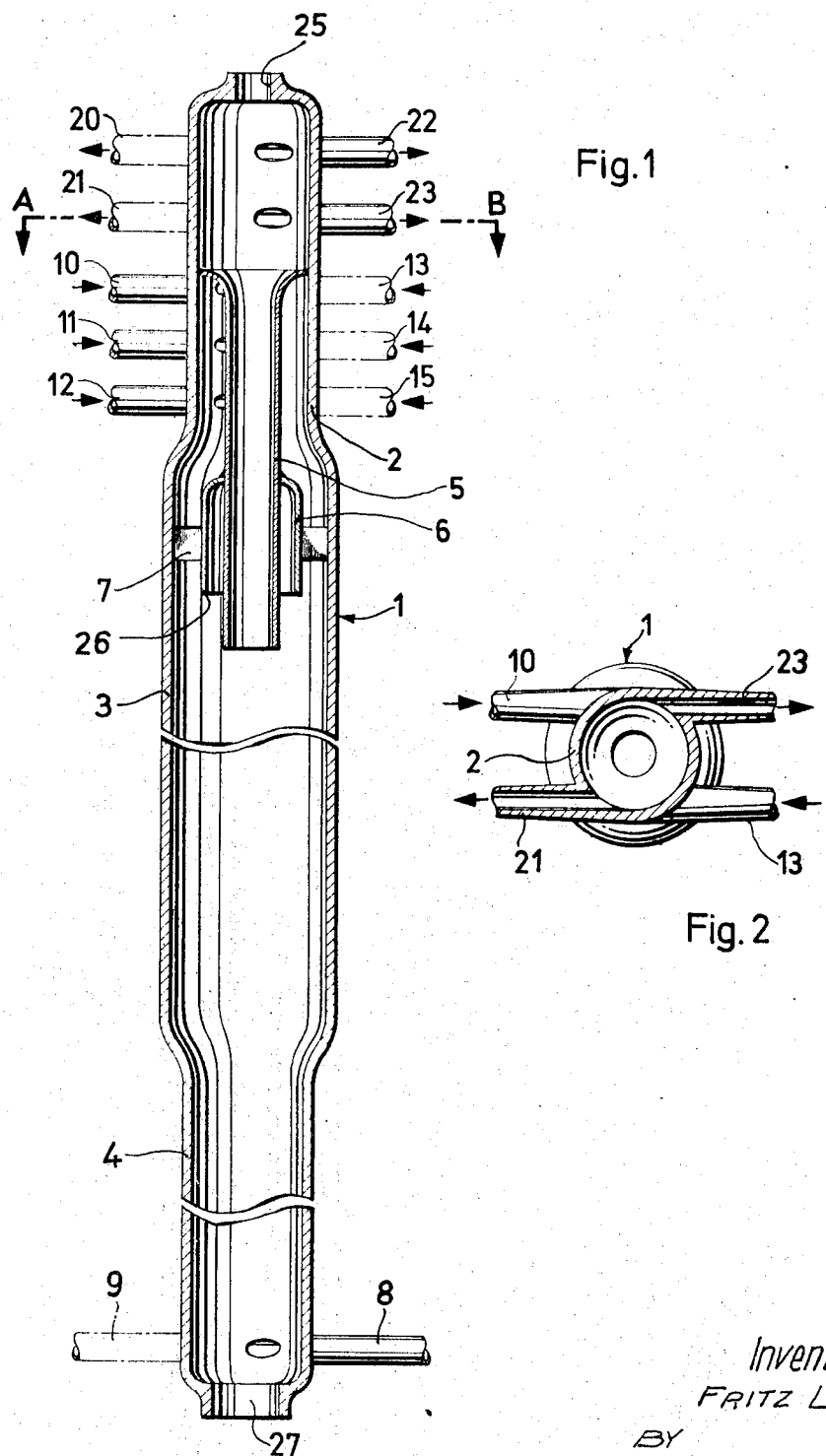

United States Patent [19]

Laubli

[11] 3,789,588

[45] Feb. 5, 1974

[54] LIQUID SEPARATOR FOR A STEAM-WATER MIXTURE

[75] Inventor: Fritz Laubli, Einterthur, Switzerland

[73] Assignee: Sulzer Brothers Ltd., Winterthur, Switzerland

[22] Filed: June 2, 1971

[21] Appl. No.: 149,231

[30] Foreign Application Priority Data

June 5, 1970 Switzerland.......................... 8445/70

[52] U.S. Cl...................... 55/419, 55/449, 55/451, 55/457, 55/460, 55/DIG. 23
[51] Int. Cl............................................. B01d 45/12
[58] Field of Search 55/DIG. 22, DIG. 23, 391, 419, 55/424, 449, 451, 456–457, 459–460, 478

[56] References Cited
UNITED STATES PATENTS

| 323,891 | 8/1885 | Stratton | 55/459 X |
|---|---|---|---|
| 385,263 | 6/1888 | Hardenbergh | 55/457 |
| 1,523,916 | 1/1925 | Tomkins | 55/451 |
| 1,818,905 | 8/1931 | McGee | 55/391 X |
| 1,933,730 | 11/1933 | Gredell | 55/391 |
| 2,349,831 | 5/1944 | Osgood | 55/391 X |
| 2,981,369 | 4/1961 | Yellott et al. | 44/451 X |
| 2,573,556 | 10/1951 | Fain | 55/478 X |
| 3,481,118 | 12/1969 | Willis et al. | 55/459 X |
| 3,633,344 | 1/1972 | Blank | 55/459 X |
| 2,252,581 | 8/1941 | Saint-Jacques | 55/459 X |
| 2,796,949 | 6/1947 | Schneider | 55/460 |
| 3,443,364 | 5/1969 | Saltsman | 55/459 X |
| 2,214,658 | 9/1940 | Browning | 55/419 X |

FOREIGN PATENTS OR APPLICATIONS

| 15,337 | 1902 | Great Britain | 55/DIG. 23 |
|---|---|---|---|
| 71,064 | 1/1916 | Austria | 55/391 |
| 257,168 | 8/1926 | Great Britain | 55/449 |
| 965,988 | 12/1962 | Great Britain | 55/460 |
| 379,978 | 11/1955 | Netherlands | 55/460 |

*Primary Examiner*—Frank W. Lutter
*Assistant Examiner*—Vincent Gifford
*Attorney, Agent, or Firm*—Hugh A. Chapin; Francis C. Hand

[57] ABSTRACT

The spigots are tangentially connected to the vertical vessel with the steam-water mixture supply spigots and steam discharge spigots both connected to the upper tube portion. The flow path for the mixture is of constant cross-section between the first and second tube portions while the central tube permits the separated steam to pass upwardly to the discharge spigots.

5 Claims, 2 Drawing Figures

Inventor:
FRITZ LAUBLI

LIQUID SEPARATOR FOR A STEAM-WATER MIXTURE

This invention relates to a liquid separator for a steam-water mixture.

This invention provides a liquid separator for a steam-water mixture having a tubular separator vessel and a plurality of spigots connected to the vessel. The vessel is disposed with a central axis in a vertical plane and is subdivided into two tube portions. The upper tube portion is provided with a plurality of spigots for the supply of the mixture and for the discharge of the steam, respectively. In addition, the axis of each spigot is situated transversely of the central axis of the separator vessel. The second tube portion adjoins the lower end of the first tube portion and encloses a separation zone while being void of any supply and/or discharge apertures in its surface. These first and second tube portions have substantially the same wall thickness and the second tube portion has a larger diameter than the first tube portion.

This construction of the separator has considerable advantages. Since the supply and discharge spigots are connected to the first tube portion with the spigot axes disposed transversely of the central axis of the separator vessel, the first tube portion can be designed like a conventional steam boiler header as regards strength. Thus, the construction of the separator vessel is greatly simplified, particularly since its wall thickness, apart from the end walls, is substantially constant throughout. The uniform wall thickness of the separator vessel is also favorable inasmuch as thermal stresses are reduced or obviated. Another advantage of the arrangement of the supply and discharge spigots is that the top end wall of the vessel can be left free from such spigots and can be provided with an opening through which the interior of the vessel can be inspected.

According to an advantageous development of the invention, the separator vessel comprises a third tube portion which adjoins the bottom end of the second tube portion and which is provided with a plurality of spigots for the discharge of the separated liquid. The axis of each such spigot in this tube portion is also disposed transversely of the central axis of the vessel. The third tube portion also has substantially the same wall thickness as the second tube portion and a smaller diameter than the second tube portion. Consequently, the bottom part of the vessel can also be designed as a conventional header and this also contributes to an economic and simple separator construction. Another advantage is that the third tube portion is very suitable for the connection of a level measuring system so that the second tube portion requires no small boreholes for a measuring system.

According to another embodiment of the invention, the spigots for the supply of the mixture, for the discharge of the steam, and for the discharge of the separated liquid are connected tangentially to the associated tube portion. The advantage of this is that the stresses in the region of these connections are reduced.

These and other objects of the invention will become more apparent from the following detailed description taken in conjunction with the accompanying drawings in which:

FIG. 1 illustrates an axial sectional view through a separator according to the invention; and FIG. 2 illustrates a view taken on line A - B in FIG. 1.

Referring to FIG. 1, the separator has a vessel 1 with a central axis which is vertical. The vessel 1 consists essentially of a first tube portion 2, a second tube portion 3 and a third tube portion 4. The first tube portion 2 forms the top part of the separator vessel 1 and has a bottom end which merges into the second tube portion 3, which has a larger diameter than the tube portion 2. Six input spigots 10, 11, 12, 13, 14 and 15 for the supply of a steam-water mixture are connected to lead tangentially into the first tube portion 2 and are arranged in pairs opposite one another in the same planes situated at right angles to the central axis of the vessel 1. Four output spigots 20, 21, 22 and 23 for the discharge of the steam are also provided on the first tube portion 2 above the six supply spigots 10 to 15 and are also connected tangentially and arranged in pairs opposite one another in the same plane at right angles to the vessel central axis.

A tube 5 is disposed coaxially of and in the first tube portion 2 and has a top end which flares out trumpet-fashion. This top end is welded to the wall of the first tube portion 2 between the supply spigots 10 – 15 and the discharge spigots 20 – 23 while the bottom end of the tube 5 projects into the second tube portion 3. As a result, a closed flow path is formed from the supply spigots 10 – 15 downwardly past the outside of the tube 5 and thence upwardly through the tube 5 to the discharge spigots 20 – 23. In addition, a bell-shaped member 6 is disposed on the tube 5 in the region of the transition from the first tube portion 2 to the second tube portion 3, so that the flow cross-section from the tube portion 2 to the second larger-diameter tube portion 3 is substantially constant. The axial length of the bell-shaped member 6 is such that the bottom edge 26 is situated above the bottom end of the tube 5. The edge 26 thus forms a discontinuity edge which prevents liquid from reaching the bottom end of the tube 5 and being entrained there by steam flowing up through the tube 5. A means 7 for imparting a swirl to the mixture flowing through between the bell-shaped member 6 and the wall of the second tube portion 3 is also provided. This means 7 is formed by inclined radial vanes distributed uniformly over the periphery of the member 6 and spanning the space between the vessel wall and the member 6.

A separating zone, which is peripherally enclosed by the second tube portion 3 is disposed beneath the swirl imparting means 7 while the bottom end of the zone is followed by the third tube portion 4. During operation the separated liquid collects in the lowest tube portion 4 and flows out of the separator vessel 1 via two spigots 8 and 9 which are connected tangentially to the third tube portion 4 and are situated in the same plane at right angles to the vessel central axis. As shown, all three tube portions 2, 3, 4 of the vessel 1 have substantially the same wall thickness. The tube portions 2 and 4 are dimensioned in accordance with the standards for conventional boiler headers, and this simplifies the construction and production of the separator vessel.

The end wall of the third tube portion 4 is provided with a manhole opening 27 which can be closed by a cover (not shown). The end wall of the first tube portion 2 is also formed with an opening 25 which can be closed by a cover. A rope can be dropped through the opening 25 so that anyone inspecting the interior of the separator can be pulled up by means of this rope through the manhole 27 in the separator vessel. If the size of the inside diameter of the tube 5 is sufficient, the opening 25 can also be formed as a manhole and the inspector can be admitted to the separator from above.

What is claimed is:

1. A liquid separator comprising a one-piece tubular separation vessel having a vertically disposed central axis, said vessel having a first cylindrical tube portion at an upper end to receive a steam-water mixture, a second cylindrical tube portion defining a peripherally enclosed separation zone for the separation of water and steam below said first tube portion of substantially the same wall thickness as said first tube portion and of larger diameter than said first tube portion, and a third cylindrical tube portion below said second tube portion for the collection of separated water, said third tube portion being of the same wall thickness as said second tube portion;

a plurality of input spigots connected transversely of said central axis to and tangentially of said first tube portion for supplying a steam-water mixture into said vessel;

a plurality of output spigots connected transversely of said central axis to and tangentially of said first tube portion above said input spigots for discharging steam from said vessel;

a tube connected between said input spigots and said output spigots and disposed coaxially of said first tube portion and projecting into said second tube portion to form a closed flow path from said input spigots through said tube to said output spigots, said tube being of smaller diameter than said first tube portion and having an enlarged upper end;

a means for imparting a swirl to the water-steam mixture flowing between said tube and said second tube portion; and a bell-shaped member for maintaining a constant flow cross-section between the wall of said vessel and said tube in a transition region between said first tube portion and said second tube portion, said bell-shaped member being secured to said coaxial tube with the bottom edge of said member situated above the bottom end of said tube.

2. A liquid separator as set forth in claim 1 wherein said third tube portion is of a smaller diameter than said second tube portion, and wherein said separator further comprises a plurality of output spigots connected to said third tube portion for discharging separated water therefrom. Each said spigot of said latter spigots having an axis disposed transversely of said central axis of said vessel and tangentially of said third tube portion.

3. A liquid separator as set forth in claim 1 wherein said means for imparting a swirl to the mixture is positioned between said second tube portion and said member.

4. A liquid separator as set forth in claim 1 wherein said vessel has a closable opening in the top end wall thereof.

5. A liquid separator as set forth in claim 1 wherein said vessel has a closable opening in the bottom end wall thereof.

* * * * *